June 11, 1963 W. E. WORLEY ETAL 3,092,960
FUEL CONTROL SYSTEM FOR RAMJET ENGINE
Filed April 10, 1958 5 Sheets-Sheet 1

FIG-1

INVENTORS
WILLIAM E. WORLEY.
RICHARD B. FARRAR.
BY Cecil J. Arens
ATTORNEY.

FIG_4

FIG. 5

United States Patent Office 3,092,960
Patented June 11, 1963

3,092,960
FUEL CONTROL SYSTEM FOR
RAMJET ENGINE
William E. Worley and Richard B. Farrar, Mishawaka, Ind., assignors to The Bendix Corporation, a corporation of Delaware
Filed Apr. 10, 1958, Ser. No. 727,739
13 Claims. (Cl. 60—35.6)

This invention relates to thermal air-propulsion power plants such as those used to propel pilot controlled aircraft and guided missiles and in particular relates to a fuel control system for controlling the thrust output of such a power plant.

The usual ramjet engine is provided with a fixed area air intake through which air flows into a diffuser section where the air undergoes a decrease in velocity and an increase in pressure. The pressurized air then flows to a combustion chamber where it mixes with fuel supplied by the fuel control system in proportion to the mass flow of the air and is ignited. The products of combustion exit from the combustion chamber through a fixed area discharge nozzle at increased velocity to the atmosphere thereby providing a propelling force or thrust to the aircraft or missile in which the engine is mounted. The thrust developed by the ramjet engine when in flight is controlled solely by the amount of fuel that is supplied by the fuel system to the combustion chamber in accordance with selected variables of operation.

Inasmuch as a ramjet engine is incapable of providing thrust under static operating conditions, separate thrust producing apparatus such as a rocket or a turbo-jet engine suitably mounted on the aircraft or missile must be utilized to launch the ramjet engine and bring it up to a predetermined minimum speed whereby the ram air effect at the intake of the ramjet will enable the combustion process to develop thrust sufficient to make the ramjet engine self-sustaining in flight. Upon reaching the predetermined minimum speed at which ramjet operation occurs, the separate thrust producing means may be rendered inoperative in the case of a turbo-jet engine or discarded in the case of a rocket assist. At the instant when the separate thrust producing means is rendered inoperative, the ramjet fuel system must be capable of immediate operation in such a manner that the flow of fuel which is delivered to the combustion chambers to maintain the propulsive force required to propel the aircraft or missile is regulated in a precise manner in accordance with a predetermined performance schedule.

An object of this invention is to provide a fuel control system having a high degree of reliability and which requires a minimum space allocation in the environment in which it is operated.

Another object of this invention is to provide a fuel control system for an airborne combustion engine which regulates a flow of fuel in accordance with flight Mach number.

A further object of this invention is to provide a fuel control system for an airborne combustion engine which regulates fuel flow in accordance with a predetermined relationship between flight Mach number and flight altitude.

A still further object of this invention is to provide a pilot fuel regulator and a main fuel regulator which operate independently of each other.

A further object of this invention is to provide improved fuel control apparatus for a jet engine.

Other objects and advantages of our invention will become apparent from the following description in connection with the drawings in which.

Figure 1:
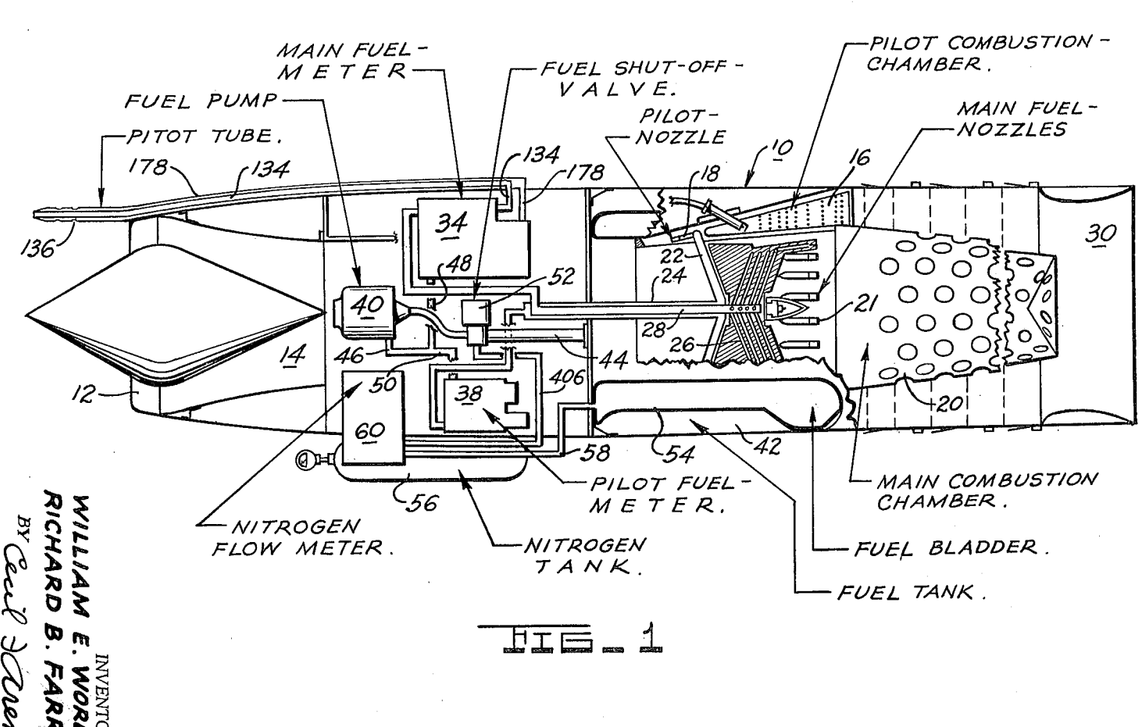
FIGURE 1 illustrates diagrammatically a ramjet power plant and a fuel system embodying the present invention.

FIGURE 1

Referring to FIGURE 1, numeral 10 represents a ramjet engine having a restricted inlet 12 through which air flows into a diffuser section 14 where a major portion of the velocity pressure of the air is converted into a relatively high static pressure. The high pressure air flows from the diffuser section into pilot combustion chamber 16 which receives fuel by way of individual pilot nozzles 18 and main combustion chamber 20, which receives fuel by way of main nozzles 21. The pilot nozzles 18 are manifolded and receive fuel through struts 22 from a pilot fuel line 24 and the main nozzles 21 receive fuel through individual fuel lines 26 from a main fuel line 28. The fuel lines 24 and 28 are concentrically arranged. The fuel and air mixture in the combustion chambers 16 and 20 is burned and the resulting hot motive gases issue therefrom into an exhaust section 30 from which the gases flow to the atmosphere to provide thrust which propels the engine in a well-known manner.

The main fuel line 28 is connected to the outlet of a main fuel meter 34 which functions to regulate the fuel supply and thus the thrust output of the engine in accordance with certain parameters of engine operations as described hereinafter. The pilot fuel line 24 is connected to the outlet of a pilot fuel meter 38 which functions to maintain a predetermined optimum flow of fuel to the combustion chambers to avoid combustion chamber flame out.

An air turbine-driven pump 40 receives fuel at boost pressure from an annular fuel tank 42 via a conduit 44 and discharges fuel at pump discharge pressure $P_1$ to a discharge conduit 46 having branch passages 48 and 50 which communicate with the inlet of main fuel meter 34 and pilot fuel meter 38, respectively. A fuel shut-off valve 52 is provided in conduit 44 between the pump 40 and fuel tank 42. The fuel tank 42 is provided with an annular bladder 54 which is pressurized with nitrogen from a high pressure nitrogen tank 56 via a conduit 58 and a nitrogen flow meter 60 which controls the flow of nitrogen through conduit 58 as will be hereinafter described.

Main Fuel Meter

Figure 2:
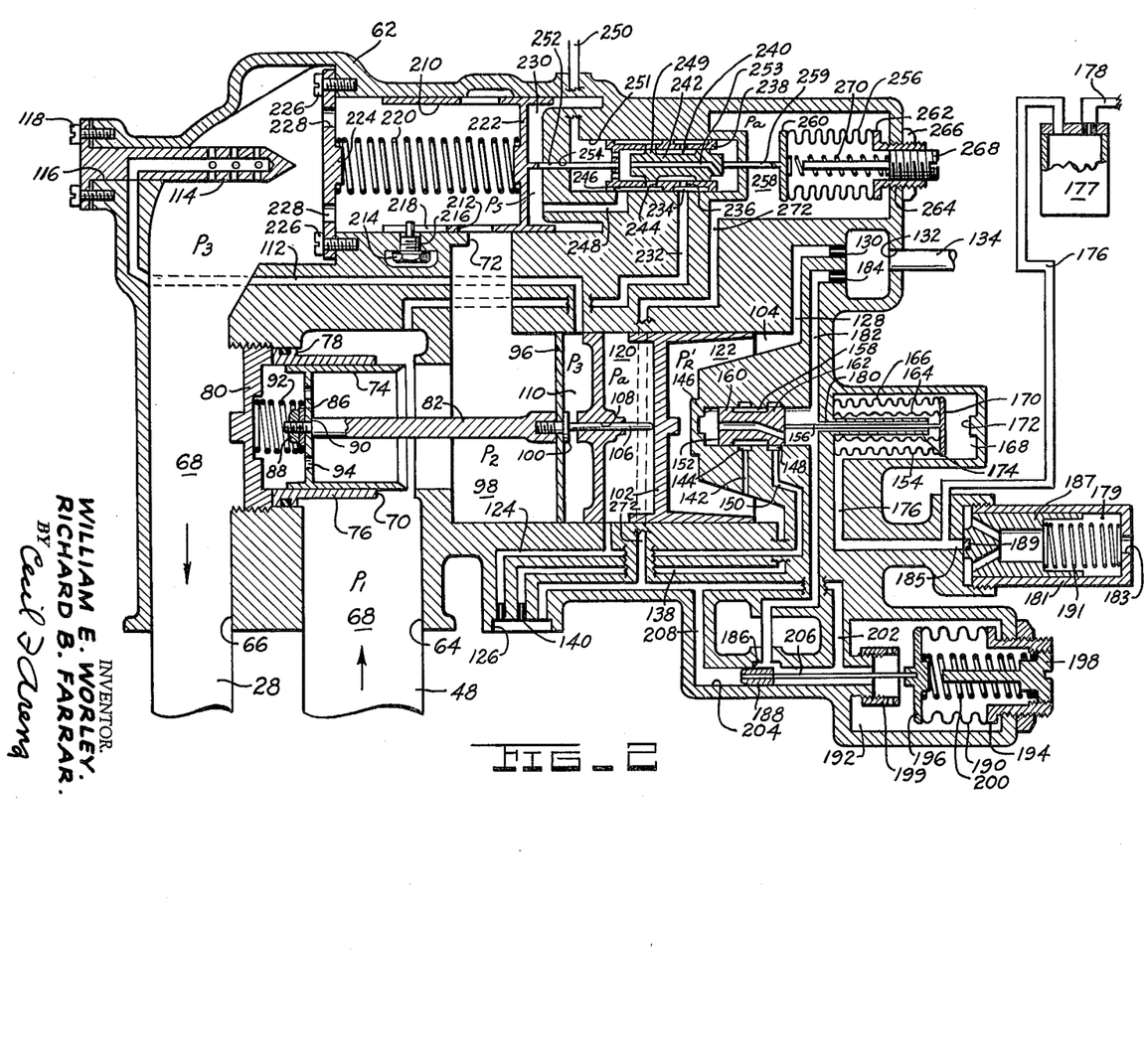
FIGURE 2 is a section view of the main fuel meter of FIGURE 1.

Referring to FIGURE 2, which represents the main fuel meter 34 in sectional schematic form, numeral 62 indicates a casing having inlet and outlet ports 64 and 66 connected to passage 48 and conduit 28, respectively. Fuel flows from the inlet port 64 to the outlet port 66 by way of a conduit 68 which includes two variable area orifices 70 and 72. The flow of fuel through conduit 68 is controlled as a function of Mach number, $N_m$, by a slide valve 74 which coacts with the variable area orifice 70 to vary the effective flow area thereof. The slide valve 74 is slidably contained by a sleeve member 76 which is fixedly secured in position against a shoulder 78 found in casing 62 by a cap 80 threadedly engaged with casing 62. A rod 82 extends through the center wall 86 and is fixedly secured to wall 86 by a nut 88 which is threadedly engaged with the end of rod 82 and which locks the wall 86 in position against a shoulder 90 formed on said rod. The cylindrical valve member 74 is preloaded by a spring 92 interposed between wall 86 and cap 80. A plurality of openings 94 formed in the wall 86 provides for flow therethrough and equalization of pressure across both of said walls.

A circular plate 96 slidably carried in a chamber 98 is fixedly secured to one end of the rod 82 by a screw member 100 which is threadedly engaged with the rod 82. The cylindrical valve member 74 is positioned in accordance with a variable pressure differential $P_r'-P_a$ applied across a piston 102. The pressure $P_r'$ is a control pressure derived from ram air $P_r$ as will be explained hereafter and the pressure $P_a$ is atmospheric or ambient air pressure. The piston 102 is slidably carried in a chamber 104 and bears against one end of a pin 106 which extends through and is slidably engaged with an opening 108 in casing 62 between chambers 98 and 104. The opposite end of the pin 106 bears against the screw member 100. The circular plate 96 together with casing 62 defines a variable volume chamber 110 to which metered fuel at pressure $P_3$ downstream from variable area orifice 72 is supplied via a passage 112 and a perforated probe 114 fixedly secured in an opening 116 in casing 64 by screws 118 threadedly engaged with casing 62. The opposite side of the circular plate 96 is exposed to fuel at pressure $P_2$ downstream from variable area orifice 70. The $P_2-P_3$ pressure differential applied to circular plate 96 acts in opposition to the $P_r'-P_a$ pressure differential across piston 102 and the cylindrical valve member 74 is stabilized in position when the two pressure differentials are equalized. Thus, for a given $P_r'-P_a$ pressure differential across the piston 102 a corresponding $P_2-P_3$ pressure differential is developed across the variable area orifice 72 which results in a corresponding rate of fuel flow through the orifice 72.

The piston 102 divides the chamber 104 into two variable volume chambers 120 and 122 which communicate with atmospheric or ambient pressure $P_a$ via a restricted passage 124 and a port 126 and ram air pressure $P_r$ via a passage 128 having a restriction 130 therein, a port 132, and a conduit 134 leading to a ram pressure pick up in a Pitot tube 136 (see FIGURE 1), respectively. In order to reduce the pressure in variable volume chamber 122 to a predetermined percentage of the relatively high ram air pressure $P_r$ such that excessive loading of the system may be avoided the variable volume chamber 122 is vented to the port 126 via a passage 138 having a restriction 140 therein. The percentage relationship between the ram air pressure $P_r$ and chamber 122 pressure may be varied by changing the area ratio between the restrictions 130 and 140 as desired. The variable volume chamber 122 is vented to atmospheric pressure $P_a$ via a circuit in parallel flow relationship with passage 138 which circuit included a passage 142, an inlet annulus 144, a bore 146, an outlet annulus 148 and a passage 150 leading to passage 124. The flow through this circuit is controlled by a spool valve 152 slidably mounted in bore 146 and connected to a bellows assembly 154 by means of a rod 156. An annulus 158 formed between two lands 160 and 162 on the spool valve 152 communicates with inlet annulus 144 at all times and, depending upon the position of land 162 relative to the outlet annulus 148, communicates to a greater or lesser degree with the outlet annulus 148.

The spool valve 152 is positioned as a function of Mach number by Mach number sensing apparatus which includes the bellows assembly 154 in which an inner bellows 164 and an outer bellows 166 are concentrically mounted. The bellows assembly 154 is mounted in a chamber 168 and fixedly secured at opposite ends to casing 64 and a cover plate 170, respectively, by any suitable means which provides an air tight seal between the space between the bellows 164 and 166 and chamber 168. The space between the bellows 164 and 166 is evacuated to substantially zero pressure. The bellows assembly 154 is limited to a predetermined range of movement by stop members 172 and 174 oppositely disposed to cover plate 170. The outer bellows 166 communicates with atmospheric or ambient pressure $P_a$ via chamber 168, a passage 176, a plenum chamber 177, and a restricted passage 178 leading to a static pressure pick up in the Pitot tube 136.

A chamber 179 formed by a cup-shaped member 181 threadedly engaged with casing 62 is vented to atmospheric pressure $P_a$ via a port 183 connected to passage 178 via a passage 185. Communication between the passage 185 and chamber 179 is controlled by an acceleration responsive "g" weight 187 slidably mounted in chamber 179 and provided with a resilient sealing member 189 at one end. A spring 191 interposed between the "g" weight 187 and cup-shaped member 181 acts to bias the "g" weight toward casing 62 such that the resilient sealing member 189 engages casing 62 thereby shutting off communication between passage 185 and chamber 179. In response to a predetermined "g" force caused by acceleration of the missile during launch, the "g" weight 187 is displaced against spring 191 whereupon the passage 185 is vented to atmospheric pressure $P_a$ through chamber 179 and port 183.

The inner bellows 164 is connected via a passage 180 to a conduit 182 connected between the port 132 at ram air pressure $P_r$ and port 126 at atmospheric or ambient pressure $P_a$. In conduit 182, there is provided a fixed restriction 184 upstream from bellows 164 and a variable area orifice 186 downstream from bellows 164 between which a control pressure $P_r''$ is developed. In the bellows assembly 154, there exists a ratio between the effective area of the inner bellows 164 to the effective area of the outer bellows 166 such that with an application of ram air pressure $P_r$ and atmospheric pressure $P_a$ to the inner and outer bellows, respectively, the bellows assembly 154 will assume its full length when the ratio of absolute pressures $P_r''$ and $P_a$ is equal to the effective area ratio of the two bellows 164 and 166. Since the ratio of ram air pressure $P_r$ to atmospheric pressure $P_a$ is a function of Mach number, $N_m$, it follows that the position of the movable end of the bellows assembly 154 and thus spool valve 152 will vary in accordance with variations in the ram to atmospheric pressure ratio $$\frac{P_r}{P_a}$$

as the Mach number, $N_m$, increases or decreases from a predetermined value as determined by the selected area ratio of the bellows assembly 154.

The control pressure $P_r''$ in conduit 182 downstream from restriction 184 is modified as a function of altitude by a valve member 188 which controls the effective flow area of variable area orifice 186 in accordance with the position of the movable end of an evacuated bellows 190 mounted in a chamber 192. Opposite ends of the bellows 190 are fixedly secured to a tubular member 194 and a cover plate 196, respectively, by any suitable means which provides an air tight seal between the inside of the bellows 190 and chamber 192. A stop member 198 threadedly engaged with the tubular member 194 engages the cover plate 196 when the bellows 190 has contracted to a predetermined position in response to increasing pressure $P_a$ in chamber 192. An adjustable stop member 199 threadedly engaged with casing 62 engages cover plate 196 when the bellows 190 has expanded to a predetermined position in response to decreasing atmospheric pressure $P_a$. The bellows 190 is preloaded by a spring 200 interposed between stop member 198 and cover plate 196. The chamber 192 communicates with port 126 via a passage 202. The valve member 188 is slidably mounted in a bore 204 and is connected to the cover plate 196 by means of a rod 206. One end of the bore 204 is connected to the cover plate 196 by means of a rod 206. One end of the bore 204 communicates with passage 202 via a passage 208 such that a balance of pressures exists across valve member 188. As the bellows 190 responds to changes in the atmospheric pressure $P_a$ the valve member 188 moves accordingly to vent more or less of the pressure in conduit 182 to bore 204 at atmospheric pressure $P_a$.

The flow through conduit 68 is controlled as a function of altitude by a slide valve 210 having a port 212 which coacts with variable area orifice 72 to vary the effective flow area thereof. A guide pin 214 threadedly engaged in an opening 216 in casing 62 extends into a slot 218 formed in slide valve 210. A spring 220 interposed between a wall 222 formed in slide valve 210 and a spring retainer 224 serves to preload the valve 210 in an opening direction. The spring retainer 224 is fixedly secured in position by screws 226 threadedly engaged with casing 62 and is provided with a plurality of openings 228 through which fuel may pass with little or no restriction. The wall 222 together with casing 62 forms a variable volume chamber 230 to which fuel is supplied from conduit 68 at pressure $P_1$, via a passage 232, an inlet annulus 234 and inlet ports 236 formed in a sleeve valve 238, an annulus 240 formed in a servo valve 242, outlet ports 244 and outlet annulus 246 formed in sleeve valve 238, and a passage 248. The effective flow area of the outlet ports 244 and thus the servo pressure $P_s$ in variable volume chamber 230 is controlled by a land 249 formed on servo valve 242, which land depending upon the position of servo valve 242 relative to the sleeve 238, serves to vent outlet ports 244 to annulus 240 or to the interior of sleeve valve 238 which communicates with a drain passage 250 and a bore 251. A passage 253 extends axially through the servo valve 242 and provides for a pressure balance thereacross. The sleeve valve 238 is slidably mounted in the bore 251 and is fixedly secured to one end of a rod 252 slidably carried in an opening 254 in casing 62. The opposite end of the rod 252 is fixedly secured to the wall 222. Communication between the inlet ports 236 and outlet ports 244 is controlled by the servo valve 242 which is actuated as a function of atmospheric pressure $P_a$ by an evacuated bellows 256 mounted in a chamber 258 and connected to the servo valve 242 by way of a rod 259. The bellows 256 is sealed at one end by a cover plate 260 and at the opposite end is fixedly secured to a tubular member 262 threadedly engaged in an opening 264 is casing 62 and locked in position by a nut 266. A stop member 268 threadedly engaged with tubular member 262 serves to limit contraction of the bellows 256 to a predetermined degree. A spring 270 interposed between the stop member 268 and cover plate 260 acts to preload the bellows 256. The chamber 258 is supplied air at atmospheric or ambient pressure $P_a$ via a passage 272 connected between chamber 258 and passage 138.

*Pilot Fuel Meter*

Figure 3:
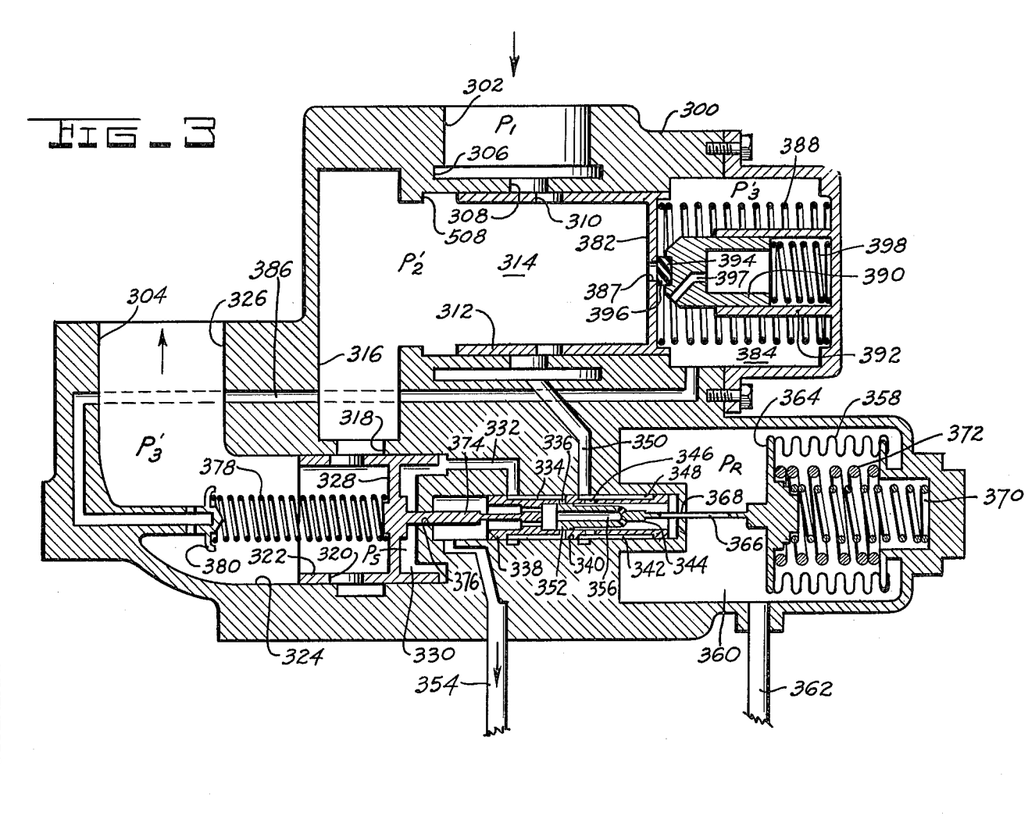
FIGURE 3 is a section view of the pilot fuel meter of FIGURE 1.

Referring to FIGURE 3, wherein the pilot fuel meter 38 of FIGURE 1 is shown in sectional schematic form, numeral 300 designates a casing having inlet and outlet ports 302 and 304 which communicate with passages 50 and 36, respectively. The pilot fuel meter 38 functions to provide the combustion chamber 16 with fuel metered in accordance with ram air pressure $P_r$ which pressure is approximately proportional to mass airflow through the engine so as to maintain a substantially constant fuel-air ratio in the combustion chambers 16. In this manner, a pilot flame is maintained in the combustion section to sustain burning of the main fuel-air mixture in the main combustion chamber. Fuel flows from the inlet port 302 to the outlet port 304 via an annulus 306 and ports 308 formed in casing 300, ports 310 formed in a slide valve 312 which controls the effective flow area of ports 308, a chamber 314 in which the slide valve 312 is slidably disposed, a passage 316 and an annulus 318 formed in casing 300, ports 320 formed in a slide valve 322 which controls the effective flow area of annulus 318, a bore 324 in which the slide valve 322 is slidably disposed and a passage 326. The effective flow area of annulus 318 is controlled in accordance with the position of ports 320 relative to the annulus 318 as determined by the slide valve 322 which moves in response to a control fuel pressure $P_s$ applied against a wall 328 integral with slide valve 322, which wall together with casing 300 forms a variable volume chamber 330. The variable volume chamber 330 is arranged to communicate with annulus 306 at fuel pressure $P_1$ via a passage 332, an annulus 334 and ports 336 formed in a sleeve valve 338 which is slidably mounted in a bore 340, an annulus 342 formed in a servo valve 344 which is slidably mounted in the sleeve valve 338, ports 346 and an annulus 348 formed in the sleeve valve 338 and a passage 350. A land 352 formed on the servo valve 344 registers with the ports 336 in sleeve valve 338 and controls communication between annulus 342 and the ports 336 as well as between the ports 336 and the interior of the sleeve valve 338 which interior is vented to a drain source such as atmospheric pressure $P_a$ via bore 340 and a passage 354. The servo valve 344 is provided with an axial passage 356 which serves to maintain a pressure balance thereacross.

The servo valve 344 is actuated by an evacuated bellows 358 mounted in a chamber 360 to which ram air pressure $P_r$ is communicated via passage 134 and a passage 362. One end of the bellows 358 is fixedly secured to casing 300 by means of a suitable air tight connection and the opposite end of the bellows 358 is fixedly secured to a cover plate 364 by means of a suitable air tight connection. A rod 366 slidably carried in an opening 368 in casing 300 at the end of bore 340 is fixedly secured to a servo valve 344 and cover plate 364. A pair of springs 370 and 372 interposed between cover plate 364 and casing 300 serve to preload the evacuated bellows 358. The sleeve valve 338 functions as a follower member and is fixedly secured to the wall 328 by means of a rod 374 slidably carried in an opening 376 in casing 300 between bore 340 and variable valve chamber 330.

A spring 378 interposed between wall 328 and a spring support 380 formed on casing 300 serves to bias the sleeve valve 322 to a wide open position.

The slide valve 312 functions to control the effective flow area of the ports 308 in accordance with a predetermined constant pressure drop $P_2'-P_3'$ across the sleeve valve 322 under predetermined conditions of operation which occur subsequent to missile launch as explained hereinafter. To this end, the sleeve valve 312 is provided with a wall 382 one side of which is exposed to the fuel pressure $P_3'$ in a chamber 384, which chamber communicates with passage 326 via a passage 386. A centrally located orifice 387 in wall 382 communicates chamber 314 with chamber 384. A spring 388 interposed between wall 382 and casing 300 serves to bias the sleeve valve to a wide open position. A cup-shaped "g" weight 390 slidably disposed in a cylinder 392 formed in casing 300 is provided with a recess 394 in which a resilient sealing member 396 is carried. A passage 397 formed in the "g" weight 390 conveys fuel from chamber 384 to the interior of the cylinder 392 such that a balance of fuel pressure exists across the "g" weight 390. A spring 398 interposed between casing 300 and the "g" weight 390 serves to bias the "g" weight 390 toward wall 382 such that the resilient sealing member 396 engages orifice 387 to seal off communication between chambers 314 and 384. In response to a predetermined "g" force caused by acceleration of the missile during launch, the "g" weight 390 is displaced against spring 398 whereupon communication is established between chambers 314 and 384.

*Nitrogen Flow Meter*

Figure 4:
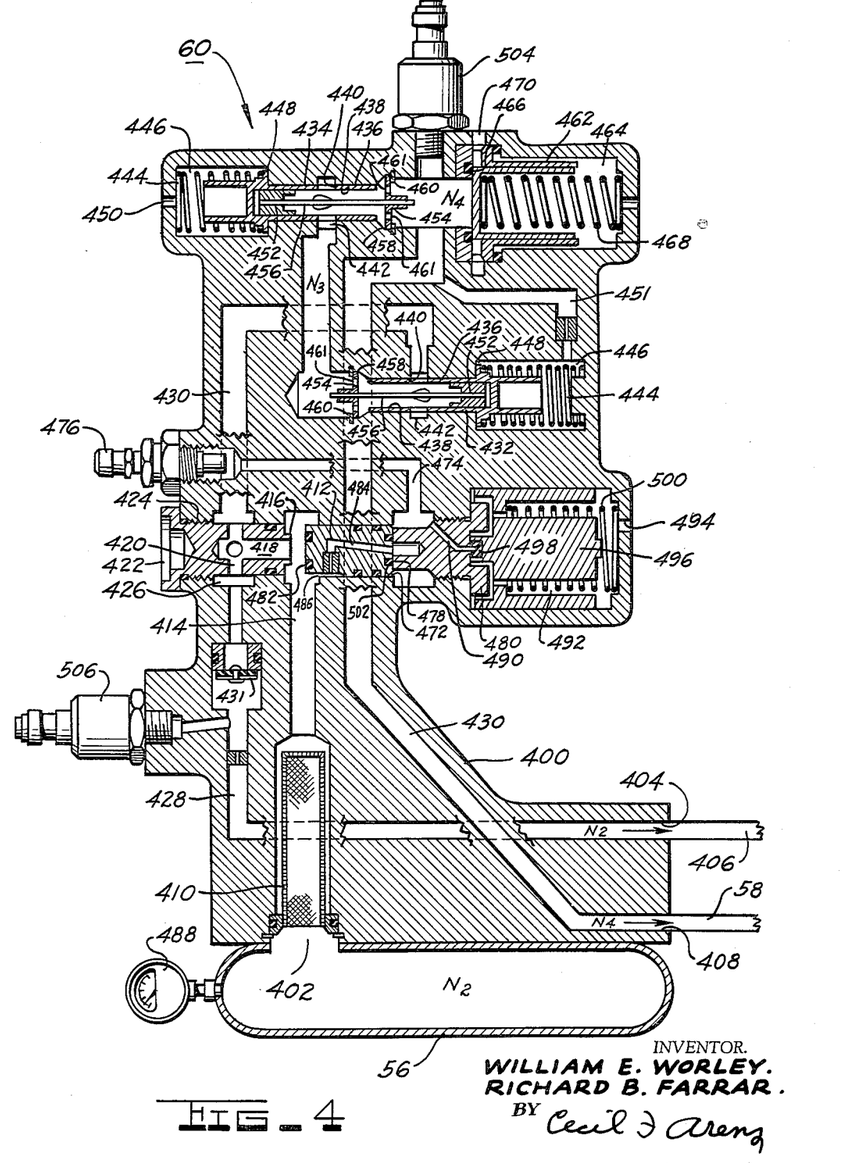
FIGURE 4 is a section view of the nitrogen fuel meter of FIGURE 1.

Referring to FIGURE 4, the nitrogen flow meter 60 of FIGURE 1 is shown in sectional schematic form. The nitrogen flow meter 60 serves two purposes, namely, that of supplying nitrogen at a predetermined regulated pressure in excess of atmospheric air pressure $P_a$ to the bladders 54 for fuel pressurization at the beginning of launch and during missile flight and that of shutting off the supply of said regulated nitrogen pressure during storage.

The nitrogen flow meter includes a casing 400 having an inlet port 402 connected to the nitrogen tank 56, an outlet port 404 connected to the fuel shut-off valve 52 via passage 406 and an outlet port 408 connected to the bladder 54 via passage 58. Nitrogen at supply pressure $N_2$ flows from the inlet port 402 through a filter 410 to a nitrogen shut-off valve 412 via a conduit 414. The shut-off valve 412 is shown in an open position whereby nitrogen at supply pressure $N_2$ is permitted to flow through a valve seat 416, an axial passage 418 and radial passages 420 formed in a plug 422 threadedly engaged in an opening 424 in casing 400. From the radial passages 420, the nitrogen flows an annulus 426 to two conduits 428 and 430 which communicate with outlet ports 404 and 408, respectively. A check valve 431 disposed in conduit 428 serves to prevent reverse flow therethrough. The flow through conduit 430 is controlled by a first stage pressure regulator 432 and a second stage pressure regulator 434. The second stage pressure regulator 434 functions to maintain a predetermined constant pressure differential between output nitrogen pressure $N_4$ and atmospheric pressure $P_a$ and the first stage pressure regulator 432 functions to maintain the $N_3-N_4$ nitrogen pressure drop across the second stage pressure regulator at a predetermined constant value. Each of the pressure regulator units 432 and 434 includes a cylindrical slide valve 436 slidably carried in a bore 438 in casing 400 and provided with ports 440 which coact with an annulus 442 to vary the effective flow area of the slide valve 436. The slide valve 436 is urged to a fully open position by a spring 444 interposed between the casing 400 and a flange 448 formed on a closed end of the slide valve 436 and acts to bias the flange into contact with casing 400 at one end of chamber 446. The second stage pressure regulator chamber 446 is vented to atmospheric or ambient pressure $P_a$ via a port 450 and the first stage pressure regulator chamber 446 is vented to conduit 430 downstream from the first stage pressure regulator via a restricted passage 451. A damping piston 452 is slidably engaged with the inner surface of the slide valve 436 and fixed in position relative to a retaining member 454 to which the damping piston 452 is fixedly secured by means of a rod 456. The retaining member 454 is secured in position against a shoulder 458 formed in casing 400 by a snap ring 460. The retaining member 454 is provided with openings 461 through which the nitrogen flows.

A pressure relief valve 462 slidably mounted in a chamber 464 is biassed to a closed position against a valve seat 466 through which chamber 464 communicates with conduit 430 at nitrogen pressure $N_4$ by a spring 468 interposed between the pressure relief valve 462 and casing 400. The chamber 464 is vented to atmospheric pressure $P_a$ via ports 470. The pressure relief valve 462 is responsive to a predetermined maximum allowable pressure differential between nitrogen pressure $N_4$ and atmoshperic pressure $P_a$ at which maximum pressure differential the relief valve 462 opens and vents conduit 430 to chamber 464 at atmospheric pressure $P_a$.

The nitrogen shut-off valve 412 is slidably mounted in a bore 472 connected between conduit 414 and a passage 474 leading to a nitrogen fill valve 476 and is movable between valve seat 416 and valve seat 478 formed on a plug 480 threadedly engaged with casing 400. An annular ring of resilient sealing material 482 imbedded in one end of the shut-off valve 412 engages the valve seat 416 to seal conduit 414 from axial passage 418 when the shut-off valve 412 is pressurized by high pressure nitrogen introduced to bore 472 through fill valve 476 and passage 474 from any suitable external source of high pressure nitrogen (not shown). With the shut-off valve 412 occupying an open position as shown in FIGURE 4, the high pressure nitrogen supplied to bore 472 acts against shut-off valve 412 driving the valve toward valve seat 416 whereupon conduit 414 is sealed from axial passage 418. The high pressure nitrogen then flows through a restricted passage 484 and a notch 486 in the shut-off valve 412 to conduit 414 and nitrogen tank 56. When the nitrogen tank has been pressurized to a predetermined value as indicated by a pressure gauge 488 responsive to the pressure in tank 56 the external source of high pressure nitrogen is disconnected from the fill valve 476 whereupon pressures at opposite ends of the shut-off valve 412 become equal. However, the shut-off valve is held in the closed position due to the effective area on the opposite side by any amount equal to the circular area of the valve seat 416.

To open the shut-off valve 412, the nitrogen pressure acting against the larger effective area of shut-off valve 412 is vented to atmospheric pressure $P_a$ via a passage 490 in the plug 480, a chamber 492 and a port 494 connected between the chamber 492 and atmospheric pressure $P_a$ by means of an acceleration actuated "g" weight 496 slidably mounted in the chamber 492. The "g" weight 496 is provided with a resilient sealing member 498 imbedded in the center of a reduced diameter section thereof. A spring 500 interposed between the "g" weight 496 and casing 400 preloads the "g" weight 496 in a direction to cause the resilient sealing member 498 to seat against the plug 480 such that the passage 490 is sealed from chamber 492. In response to a predetermined "g" force caused by acceleration of the missile during launch, the "g" weight 496 is displaced against spring 500 whereupon the passage 490 is vented to chamber 492 and the nitrogen pressure in bore 472 decreases. The higher nitrogen pressure in conduit 414 then acts to drive the shut-off valve 412 toward the plug 480 causing an annular ring of sealing material 502 imbedded in the end of shut-off valve 412 to engage the valve seat 478 thereby sealing passage 484 from bore 472. The shut-off valve 412 is held in the open position by the nitrogen pressure $N_2$ in conduit 414 which acts on the entire cross sectional area of the shut-off valve 412.

A vent valve 504 is connected to conduit 430 downstream from the second stage pressure regulator 434 and a vent valve 506 is connected to conduit 428 downstream from the check valve 432.

*Operation*

Assuming the nitrogen tank 56 to have been pressurized to a predetermined value by an external source of high pressure nitrogen (not shown), the nitrogen shut-off valve 412 will occupy the closed position heretofore mentioned such that conduits 428 and 430 are sealed from conduit 414.

The fuel tank 42 is filled to capacity from an external source of fuel (not shown). As fuel is introduced into the tank 42, the bladder 54 is compressed and the pressure therein is vented to the atmosphere via passage 58, conduit 430 and vent valve 504.

Now, assuming that a rocket booster has been attached to the ramjet engine and all preliminary checks on the over-all unit have been made, the rocket booster is ignited to launch the ramjet engine 10. At the beginning of the boost or launch phase, ram air pressure is approximately zero such that the air turbine driver pump is rendered inoperative. During boost, the acceleration of "g" force increases at a relatively rapid rate and at approximately 10 "g's" the force imposed upon the ramjet engine 10 and its fuel system are sufficient to cause the "g" weight 496 to move overcoming the spring 500 whereupon the nitrogen pressure holding the nitrogen shut-off valve 412 closed is vented through passage 490 to chamber 492 at atmospheric pressure $P_a$. The nitrogen pressure $N_2$ in the conduit 414 acts to bias the shut-off valve 412 to an open position as shown in FIGURE 4 whereupon high pressure nitrogen flows through the valve seat 416 to conduits 428 and 430. Nitrogen at pressure $N_2$ flows through conduit 428 and passage 406 to the fuel shut-off valve 52 where it acts against a pressure responsive member of conventional design and operation (not shown) to cause opening movement of the fuel shut-off valve 52.

The high pressure nitrogen $N_2$ in conduit 430 flows to the first stage pressure regulator 432 where it leaks past the damping piston 452 and acts against the closed end of the slide valve 436 whereupon the slide valve 436 moves against spring 444 causing a decrease in the effective flow area of the ports 440 and a corresponding reduction in nitrogen pressure from supply pressure $N_2$ to approximately 100 p.s.i. above the pressure in chamber 446 at which pressure the slide valve 436 is balanced.

The nitrogen at pressure $N_3$ then flows to the second stage pressure regulator 434 where it leaks past the damping piston 452 causing the slide valve 436 to move against the spring 444 and the atmospheric pressure $P_a$ in chamber 446 whereupon the effective flow area of the ports 440 is decreased and the nitrogen pressure $N_3$ of 100 p.s.i. is reduced to output pressure $N_4$ of approximately 55 p.s.i. above the atmospheric pressure $P_a$ in chamber 446. Nitrogen at pressure $N_4$ flows from conduit 430 through the restricted passage 451 to the first stage pressure regulator chamber 446 where it acts against slide valve 436 and repositions said valve to maintain the predetermined constant pressure differential of 100 p.s.i. across the second stage pressure regulator 434.

The nitrogen at output pressure $N_4$ then flows from conduit 430 through conduit 58 to the fuel bladder 54 which expands and pressurizes the fuel in fuel tank 42. In this manner, acceleration effects on the fuel are overcome and fuel is forced past the fuel shut-off valve 52 and air turbine fuel pump 40 to the pilot and main fuel meters 38 and 34.

In the pilot fuel meter 38, the slide valve 312 is biassed against a shoulder 508 formed in casing 300 at one end of chamber 314 by the spring 388 whereby the ports 310 coact with the ports 308 to establish a maximum effective flow area through which fuel flows into the chamber 314. The "g" weight 390 activated by the aforementioned acceleration force moves away from wall 382 whereupon fuel flows through orifice 387 from chamber 314 to chamber 384 resulting in a balance of fuel pressures across wall 382. The spring 388 maintains the slide valve 312 in the wide open position.

The slide valve 322 is positioned by the servo pressure $P_s$ in chamber 330 in accordance with the ram air pressure $P_r$ supplied to the bellows 358. As ram air pressure $P_r$ increases, the bellows 358 contracts pulling servo valve 352 toward the right which results in the venting of ports 336 at servo pressure $P_s$ to bore 340 at drain pressure $P_a$. The slide valve 322 biassed by spring 378 moves in an opening direction as the servo pressure $P_s$ decreases which movement results in a corresponding movement of sleeve valve 338 such that ports 336 move into alignment with lands 352 on servo valve 344 and a null position is established.

In the main fuel meter 34 the slide valve 74 and 210 are positioned in accordance with the pressure acting against the bellows assembly 154 and bellows 256, respectively. The plenum chamber 177 which serves to introduce a lag in the transmission of atmospheric pressure $P_a$ to the bellows assembly 154 during altitude changes whereby overspeeding and underspeeding of the missile is minimized and by-passed by the action of the "g" weight 187 to move against spring 191 whereupon the passage 176 is vented to atmospheric pressure $P_a$ via passage 185 and chamber 179 such that the plenum chamber pressure will remain at near atmospheric pressure and not be adversely affected by erratic pressures in conduit 178 during the missile launch phase.

As the acceleration of the missile decreases near the end of the boost or launch phase, the acceleration activated "g" weights 496, 390 and 187 in the nitrogen flow meter 60, pilot flow meter 38 and main flow meter 34, respectively, are biassed to a closed position in response to the forces of the springs acting thereagainst. The nitrogen shut-off valve 412 remains open and the first and second stage pressure regulators 432 and 434 continue to function in the aforementioned manner such that the nitrogen pressure $N_4$ always exceeds atmospheric pressure by the aforementioned 55 p.s.i. The "g" weight 390 moves toward wall 382 causing the resilient sealing member 396 to engage and close off orifice 387 whereupon the slide valve 312 is positioned in accordance with the $P_2'-P_3'$ acting across the wall 382 and regulates the $P_2'-P_3'$ pressure drop across slide valve 322 to the aforementioned predetermined constant value. The "g" weight 187 moves toward casing 62 causing the resilient sealing member 189 to engage and close off passage 185 whereupon the passage 176 is vented to the plenum chamber 177 only.

At the end of the launch phase the rocket boost apparatus (not shown) is disconnected and dropped from the ramjet engine by suitable mechanism (not shown) which operates automatically when the end of the boost or launch phase is reached. At this time, the missile has reached sufficient velocity whereby it can operate to self-sustain itself in flight. The air turbine driven fuel pump 40 is set in motion by the pressure of the air in the diffuser section 14 which pressure acts against a turbine wheel connected to an impeller (not shown) so as to maintain adequate pressurization of the fuel supplied to the pilot and main fuel regulators over the operating range of the engine.

Figure 5:
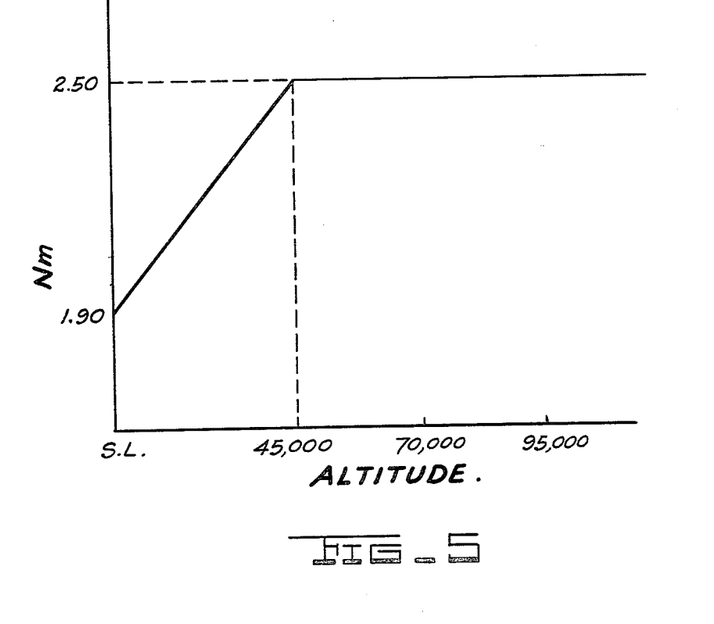
FIGURE 5 is a curve showing the relationship between flight altitude and flight Mach number.

As the missile acquires speed and altitude under its own power, the main fuel meter 34 regulates fuel flow to the combustion chamber in accordance with the Mach number, $V_s$. Altitude relationship is shown in the curve of FIGURE 5.

The area ratio of the bellows assembly 154 is selected in accordance with a control Mach number of 1.9, for example, at sea level. To change the control Mach number 1.9 to a higher value, the pressure $P_r''$ intermediate the fixed restriction 184 and the variable area orifice is varied in accordance with the effective area ratio of the fixed restriction 184 and variable area orifice 186. The valve member 188 operates to control the effective area of variable area orifice 186 as a function of atmospheric pressure $P_a$ and thus the effective area ratio between the fixed restriction 184 and said orifice such that when the over-all pressure ratio $$\frac{P_r}{P_a}$$

across said restriction and orifice corresponds to the higher Mach number, the ratio of the control pressure $P_r''$ to atmospheric pressure $P_a$ will correspond to the Mach number of 1.9. The area ratio between the fixed restriction 184 and variable area orifice 186 required to accomplish this may be determined from equations for pressure ratio characteristics of restrictions in series, which equations may be readily found in reference literature on mechanics of fluid flow.

As atmospheric pressure $P_a$ decreases with increasing altitude, the bellows 190 expands driving valve member 188 in an opening direction whereupon the effective area of orifice 186 and thus the area ratio between orifice 186 and restriction 184 increases causing a corresponding drop in the control pressure $P_r''$ applied to the inner bellows 164. The bellows assembly 154 being unbalanced by the drop in control pressure $P_r''$ tends to collapse driving the spool valve 152 in a closing direction whereupon the land 162 covers annulus 148. The pressure $P_r'$ in chamber 122 increases and the resulting increase in the $P_r'-P_a$ pressure differential acting across piston 102 overcomes the existing $P_2-P_3$ fuel pressure differential acting across the circular plate 96. The slide valve 74 is biassed in an opening direction whereupon the fuel pressure $P_2$ rises to establish a higher $P_2-P_3$ pressure differential and correspondingly greater rate of fuel flow through conduit 68, which pressure differential acts across the circular plate 96 to balance the $P_r'-P_a$ air pressure differential. The increase in fuel flow through conduit 68 results in an increase in missile speed whereupon the ram air pressure $P_r$ and thus $$\frac{P_r}{P_a}$$

pressure ratio increase accordingly. As the $$\frac{P_r}{P_a}$$

pressure ratio increases the control pressure $P_r''$ applied to the inner bellows 164 also increases with the result that upon reaching a predetermined $$\frac{P_r}{P_a}$$

ratio, the control pressure $P_r''$ will establish the required 1.9 pressure ratio at which the bellows assembly 154 is balanced. At this time the edge of the land 162 is flush with the edge of annulus 148. If the $$\frac{P_r}{P_a}$$

pressure ratio should exceed the design value for a given altitude, the control pressure $P_r''$ applied to the inner bellows 164 will increase accordingly and the bellows assembly 154 will become unbalanced and expand driving the spool valve 152 in an opening direction whereupon the land 162 uncovers annulus 148 and vents pressure $P_r'$ from annulus 158 to annulus 148 at atmospheric pressure $P_a$. The resulting drop in the $P_r'-P_a$ pressure differential across piston 102 permits the slide valve 74 to move in a closing direction until the $P_2-P_3$ fuel pressure differential balances the $P_r'-P_a$ air pressure differential at which condition the missile speed has been reduced and the bellows assembly 154 again balanced.

Final regulation of fuel flow through conduit 68 is accomplished by the slide valve 210 through the action of the bellows 256 which expands in response to decreasing atmospheric presure $P_a$ and actuates servo valve 242 toward the left whereupon land 249 uncovers ports 244 allowing fuel to flow from annulus 240 through ports 244, annulus 246 and passage 248 to variable volume chamber 230. The pressure of the fuel in variable volume chamber 230 acts against wall 222 overcoming the force of spring 220 plus the $P_3$ fuel pressure acting against the opposie side of the wall 222 and moves slide valve 210 in a closing direction. The sleeve 238 follows the movement of slide valve 210 and ports 244 are aligned with land 249 whereupon fuel is trapped in variable volume chamber 230 and the slide valve is fixed in a null position.

Then the missile reaches a predetermined altitude as, for example, 45,000 feet at which the corresponding control Mach number may be 2.50, the bellows 190 has expanded sufficiently to cause cover plate 196 to engage stop member 199 whereupon further decreases in atmospheric pressure $P_a$ have no effect on bellows 190 and the effective area of variable area orifice 186 is fixed. Consequently, at any altitude above 45,000 feet the missile is controlled at a constant Mach number of 2.50.

It will be apparent to one skilled in the art that various modifications and changes in the form and relative arrangement of parts may be made to suit requirements without departing from the spirit of the invention.

The mechanical features of the component devices which make up the fuel system have not been described in great detail and it is obvious that ordinary engineering skill and technique may be utilized to provide access means for removing and replacing parts within the various casings or for making adjustments and the like to the mechanisms. Conventional fluid seals may be used where required to seal one fluid pressure from another.

We claim:

1. In a fuel feed system for a jet engine having a combustion chamber, the combination of a fuel tank; a conduit for delivering fuel from said tank to said combustion chamber; means operatively connected to said conduit for pressurizing the fuel therein; valve means in said conduit for controlling the flow of fuel therethrough to said combustion chamber; Mach number sensing means operatively connected to said valve means for controlling the operation of said valve means in accordance with a predetermined control Mach number; means responsive to atmospheric pressure operatively connected to said Mach number sensing means for modifying said predetermined control Mach number as a function of flight altitude and stop means engageable with said last named means for rendering said last named means inoperative at a predetermined flight altitude whereupon a further decrease in atmospheric pressure has no effect on said predetermined control Mach number.

2. In a fuel feed system for a jet engine having a combustion chamber, the combination of a fuel tank; a fuel conduit for delivering fuel from said tank to said combustion chamber; means for pressurizing the fuel in said tank including a source of high pressure fluid, an expansible chamber disposed in said tank, a conduit for delivering fluid from said source to said expansible chamber, and valve means responsive to atmospheric air pressure operatively connected to said conduit for controlling the flow of fluid therethrough to said expansible chamber so as to maintain a predetermined pressure differential between the fuel in said source and said atmospheric air presure; a pilot fuel meter and a main fuel meter in parallel flow relationship in said fuel conduit for controlling the fuel flow therethrough to said combustion chamber, said pilot fuel meter including a first valve member, ram air pressure responsive means operatively connected to said valve member for controlling the operation thereof so as to maintain minimum fuel flow requirements to said combustion chamber for stable combustion, and a second valve member responsive to fuel pressure upstream and downstream from said first valve member for controlling the pressure drop across said first valve member at a predetermined constant value; said main fuel meter including a first valve member, means responsive to atmospheric air pressure operatively connected to said first valve member for controlling the operation thereof, a second valve member for controlling the pressure drop across said first valve member, means responsive to ram air pressure and atmospheric pressure operatively connected to said second valve member for controlling the operation thereof as a function of Mach number.

3. In a fuel feed system for a ramjet engine having a combustion chamber and independently operating thrust producing apparatus for launching said ramjet engine to a self-sustaining speed, the combination of a fuel tank; a conduit for delivering pressurized fuel from said tank to said combustion chamber; a pilot fuel meter responsive to ram air pressure operatively connected to said conduit for controlling the fuel flow therethrough as a function of mass air flow through said engine; a main fuel meter responsive to flight Mach number and ambient air pressure operatively connected to said conduit in parallel flow relationship with said pilot fuel meter for controlling fuel flow through said conduit in accordance with a predetermined flight Mach number vs. flight altitude relationship; and an air turbine driven fuel pump operatively connected to said conduit for pressurizing the fuel flowing therethrough.

4. In a fuel feed system for a jet engine having a combustion chamber, the combination of a fuel tank; an expansible chamber in said fuel tank; a source of high pressure fluid; a conduit for delivering fluid from said source to said expansible chamber; means responsive to atmospheric pressure operatively connected to said conduit for regulating the flow of fluid therethrough so as to maintain a predetermined pressure differential between the fuel in said tank and atmospheric pressure; a fuel conduit for delivering fuel from said tank to said combustion chamber; an air turbine driven pump in said conduit for increasing the pressure of the fuel flowing therethrough; a pilot fuel meter responsive to ram air pressure operatively connected to said conduit for controlling fuel flow therethrough as a function of mass air flow through said engine so as to maintain a minimum allowable air-fuel ratio in said combustion chamber for the combustion process; a main fuel meter operatively connected in parallel flow relationship with said pilot fuel meter in said fuel conduit, said main fuel meter including a fuel controlling valve member, pressure actuated means responsive to an air pressure derived from ram air pressure and to atmospheric pressure operatively connected to said fuel controlling valve member for actuating said valve member in accordance with variations from a predetermined ram to atmospheric air pressure ratio and means responsive to atmospheric pressure for modifying said derived air pressure as a function of atmospheric pressure to thereby cause an increase in said predetermined ram to atmospheric air pressure ratio at which said pressure actuated means responds.

5. In a fuel feed system for a jet engine having a combustion chamber, the combination of a fuel tank; a conduit for delivering fuel from said tank to said combustion chamber; means for pressurizing the fuel in said fuel tank so as to maintain a predetermined constant pressure differential between the fuel in said tank and atmospheric air pressure including an expansible chamber in said fuel tank, a source of high pressure fluid, a conduit for delivering fluid from said source to said expansible chamber and flow control means responsive to atmospheric air pressure operatively connected to said conduit for controlling the flow of high pressure fluid therethrough; an air turbine driven fuel pump in said conduit for increasing the pressure of the fuel flowing through said conduit; a pilot fuel meter responsive to ram air pressure operatively connected to said conduit for controlling fuel flow to said combustion chamber in accordance with minimum allowable fuel-air ratio requirements for stable combustion; a main fuel meter operatively connected to said conduit in parallel flow relationship with said pilot fuel meter for controlling fuel flow in accordance with a predetermined relationship between flight Mach number and flight altitude, said main fuel meter including first valve means; pressure responsive means responsive to atmospheric pressure operatively connected to said first valve means; second valve means for controlling the pressure drop across said first valve means, a piston operatively connected to said second valve means for controlling the operation thereof, a passage for communicating atmospheric air pressure to one side of said piston, a conduit connected between ram and atmospheric air pressure sources, a fixed area restriction and a variable area restriction in said conduit between which a control air pressure is developed, said control air pressure being communicated to the opposite side of said piston, means for controlling the effective flow area of said variable area restriction, pressure ratio sensing means operatively connected to said last named means for controlling the operation thereof, said pressure ratio sensing means including a pair of bellows concentrically arranged so as to define an annular chamber and two effective areas having a predetermined area ratio, said annular chamber being evacuated, a conduit for communicating ambient air pressure to the larger of the two effective areas, means operatively connected to said last named conduit for delaying the transmission of ambient air pressure through said last named conduit when changes in said ambient air pressure occur, a by-pass passage connected to said last named conduit downstream from said last named means and to ambient air pressure, acceleration responsive means operatively connected to said by-pass passage whereby said conduit is vented to ambient air pressure and said last named means is rendered inoperative during certain periods of engine operation, a conduit connected between ram and ambient air pressure sources, a fixed area restriction and a variable area orifice in said last named conduit between which a control pressure is developed, means responsive to ambient air pressure operatively connected to said variable area orifice for controlling the effective flow area thereof, a fluid connection between said control pressure and the smaller effective area associated with said pair of bellows, said pair of bellows having a null position in response to a predetermined ratio of pressures between said last named control pressure and ambient air pressure.

6. In a fuel feed system for a jet engine having a combustion chamber, the combination of a fuel tank; a conduit for delivering fuel from said fuel tank to said combustion chamber; a pilot fuel meter responsive to ram air pressure operatively connected to said conduit for controlling fuel flow therethrough as a function of mass air flow through said engine such that a substantially constant fuel-air ratio is maintained in said combustion chamber to avoid combustion chamber flame-out; a main fuel meter operatively connected to said conduit in parallel flow relationship with said pilot fuel meter; said main fuel meter including first and second valve means in series flow relationship; ambient pressure responsive means operatively connected to said first valve means for controlling the position of said first valve means as a function of flight altitude, Mach number sensing means operatively connected to said second valve means for controlling the position of said second valve means in accordance with a control Mach number, and means responsive to ambient air pressure operatively connected to said Mach number sensing means for modifying said control Mach number as a function of flight altitude.

7. In a fuel feed system for a jet engine having a combustion chamber, the combination of a fuel tank; an expansible chamber in said fuel tank; a source of high pressure fluid; a conduit for delivering fluid from said source to said expansible chamber; flow control means operatively connected to said conduit for controlling the flow of fluid therethrough; a fuel conduit for delivering fuel from said fuel tank to said combustion chamber; an air turbine driven fuel pump operatively connected to said fuel conduit for pressurizing the fuel flowing therethrough; a pilot fuel meter and a main fuel meter operatively connected to said fuel conduit for controlling fuel flow therethrough to said combustion chamber, said flow control means including a shutoff valve, acceleration responsive means for controlling the operation of said shutoff valve, first valve means responsive to atmospheric pressure for controlling the pressurization of said expansible chamber such that a constant pressure differential is maintained between atmospheric pressure and fuel tank pressure, and second valve means operatively connected to said conduit for controlling the pressure drop across said first valve means at a predtermined constant value.

8. In a fuel feed system for a jet engine having a combustion chamber, the combination of a fuel tank; an expansible chamber in said fuel tank; a source of high pressure fluid; a conduit for delivering fluid from said source to said expansible chamber; means responsive to atmospheric pressure operatively connected to said conduit for regulating the flow of fluid therethrough so as to maintain a predetermined pressure differential between the fuel in said tank and atmospheric pressure; a fuel conduit for delivering fuel from said tank to said combustion chamber; a pilot fuel meter responsive to ram air pressure operatively connected to said conduit for controlling fuel flow therethrough as a function of mass air flow through said engine so as to maintain a minimum allowable air-fuel ratio in said combustion chamber; and a main fuel meter responsive to flight Mach number and atmospheric air pressure operatively connected in parallel flow relationship with said pilot fuel meter in said fuel conduit for controlling fuel flow in accordance with a predetermined flight Mach number vs. flight altitude relationship.

9. In a fuel feed system for a jet engine having a combustion chamber, the combination of a fuel tank; a fuel conduit for delivering fuel from said tank to said combustion chamber; means for pressurizing the fuel in said tank including a source of high pressure fluid, an expansible chamber disposed in said tank, a conduit for delivering fluid from said source to said expansible chamber, and valve means responsive to atmospheric pressure operatively connected to said conduit for controlling the flow of fluid therethrough to said expansible chamber so as to maintain a predetermined pressure differential between the fuel in said tank and atmospheric pressure; a fuel pump operatively connected to said fuel conduit for pressurizing the fuel flowing therethrough; an air turbine driven by ram air pressure operatively connected to said fuel pump for driving the same; a pilot fuel meter responsive to ram air pressure operatively connected to said fuel conduit for controlling fuel flow to said combustion chamber as a function of mass air flow through said engine; and a main fuel meter responsive to the ratio of ram air pressure and atmospheric air pressure operatively connected in parallel flow relationship with said pilot fuel meter in said conduit; said main fuel meter being operative to control fuel flow to said combustion chamber as a function of the ratio of ram air pressure to atmospheric air pressure to thereby maintain a predetermined flight Mach number.

10. In a fuel feed system for a jet engine having a combustion chamber: the combination of a source of fuel; a conduit for delivering fuel from said source to said combustion chamber; valve means in said conduit for controlling the flow of fuel therethrough to said combustion chamber; control means including pressure ratio measuring means responsive to an air pressure derived from ram air pressure and to atmospheric air pressure operatively connected to said valve means for controlling the operation of said valve means as a function of the ratio of said derived and atmospheric air pressures; means responsive to an air pressure which varies as a function of flight altitude for modifying said derived air pressure as a function of flight altitude and an adjustable stop engageable with said last named means for rendering said last named means inoperative at a predetermined flight altitude whereupon a further decrease in said air pressure which varies as a function of flight altitude has no effect on the operation of said last named means.

11. In a fuel feed system for a jet engine having a combustion chamber: the combination of a fuel tank; a conduit for delivering fuel from said tank to said combustion chamber; means operatively connected to said conduit for pressurizing the fuel therein; valve means in said conduit for controlling the flow of fuel therethrough to said combustion chamber; Mach number sensing means operatively connected to said valve means for controlling the operation of said valve means in accordance with a predetermined control Mach number; means responsive to an air pressure which varies as a function of flight altitude for modifying said predetermined control Mach number as a function of flight altitude; means operatively connected to said last named means for rendering said last named means inoperative at a predetermined flight altitude whereupon a further increase in flight altitude has no effect on said predetermined control Mach number.

12. In a fuel feed system for a jet engine having a combustion chamber: the combination of a fuel tank; an expansible chamber in said fuel tank; a source of high pressure fluid; a conduit for delivering fluid from said source to said expansible chamber; means responsive to a variable air pressure associated with the air flowing through said jet engine operatively connected to said conduit for regulating the flow of fluid therethrough so as to maintain a predetermined pressure differential between the fuel in said tank and said variable air pressure; a fuel conduit for delivering fuel from said tank to said combustion chamber; an air turbine driven pump in said fuel conduit for increasing the pressure of the fuel flowing therethrough; a fuel meter operatively connected to said fuel conduit for controlling fuel flow therethrough to said combustion chamber, said fuel meter including a fuel controlling valve member, pressure actuated means responsive to an air pressure derived from ram air pressure and to atmospheric pressure operatively connected to said fuel controlling valve member for actuating said valve member in accordance with variations from a predetermined ram to atmospheric air pressure ratio, and means responsive to air pressure which varies as a function of flight altitude for modifying said derived air pressure as a function of flight altitude to thereby cause an increase in said predetermined ram to atmospheric air pressure ratio at which said pressure actuated means responds, said pressure actuated means being responsive to said air pressure ratio at all times and operative to control said fuel controlling valve member irrespective of the operating altitude of the engine.

13. In a fuel feed system for an aircraft jet engine having a combustion chamber: the combination of a fuel tank; an expansible chamber in said fuel tank; a source of high pressure fluid; a conduit for delivering fluid from said source to said expansible chamber; means responsive to a variable air pressure associated with the air flowing through said engine operatively connected to said conduit for regulating the flow of fluid therethrough so as to maintain a predetermined relationship between the pressure of the fuel in said tank and said variable air pressure; a fuel conduit for delivering fuel from said tank to said combustion chamber; and a fuel meter responsive to flight Mach number and an air pressure which varies as a predetermined function of flight altitude for controlling fuel flow to the combustion chamber in accordance with a predetermined flight Mach number vs. flight altitude relationship at all operating altitudes of the engine.

References Cited in the file of this patent

UNITED STATES PATENTS

| | | |
|---|---|---|
| 2,550,678 | Deacon | May 1, 1951 |
| 2,566,319 | Deacon | Sept. 4, 1951 |
| 2,693,675 | Schaffer | Nov. 9, 1954 |
| 2,739,444 | Chamberlain | Mar. 27, 1956 |
| 2,744,380 | McMillan | May 8, 1956 |
| 2,850,871 | Drake | Sept. 9, 1958 |
| 2,871,659 | Chamberlin et al. | Feb. 3, 1959 |
| 2,892,410 | Sloan | June 30, 1959 |
| 2,961,828 | Wheeler | Nov. 29, 1960 |

FOREIGN PATENTS

| | | |
|---|---|---|
| 762,179 | Great Britain | Nov. 28, 1956 |
| 1,135,268 | France | Dec. 17, 1956 |